United States Patent [19]
Buchanan

[11] Patent Number: 5,348,525
[45] Date of Patent: Sep. 20, 1994

[54] METHOD OF CONSTRUCTING FLEXIBLE CONTAINERS WITH TUBULAR FITMENTS

[75] Inventor: Jerry E. Buchanan, Alpharetta, Ga.

[73] Assignee: Jebco Packaging Systems, Inc., Tucker, Ga.

[21] Appl. No.: 103,569

[22] Filed: Aug. 9, 1993

[51] Int. Cl.⁵ .............................................. B31B 1/84
[52] U.S. Cl. ..................................... 493/213; 493/929
[58] Field of Search ............... 493/212, 213, 87, 923, 493/929; 53/133.1, 133.2, 133.3, 133.4

[56] References Cited

U.S. PATENT DOCUMENTS

| | | | |
|---|---|---|---|
| 3,894,381 | 7/1975 | Christine et al. | 53/128 |
| 4,023,607 | 5/1977 | Jensen et al. | 150/1 |
| 4,246,062 | 1/1981 | Christine | 156/498 |
| 4,353,761 | 10/1982 | Woerz et al. | 156/69 |
| 4,512,136 | 4/1985 | Christine | 53/410 |
| 4,603,536 | 8/1986 | de la Poype | 493/213 |
| 4,695,337 | 9/1987 | Christine | 156/69 |
| 4,887,973 | 12/1989 | Susini | 493/213 |
| 4,961,796 | 10/1990 | Perrin et al. | 156/69 |
| 4,981,463 | 1/1991 | Susini | 493/213 |
| 5,002,623 | 3/1991 | Steer et al. | 156/221 |
| 5,071,037 | 12/1991 | Moore et al. | 222/109 |
| 5,114,659 | 5/1992 | Krall | 264/539 |
| 5,176,300 | 1/1993 | Kishikawa | 493/87 |

Primary Examiner—Jack W. Lavinder
Attorney, Agent, or Firm—Kennedy & Kennedy

[57] ABSTRACT

A method is disclosed for constructing a flexible container (10) with a tubular fitment (13). The method includes placing the fitment upon a mandrel (22), positioning the mandrel supported fitment between the unsealed sides (25, 26) of the container, sealing the top edge (28) of the sides about a base portion (18) of the fitment and fully withdrawing the mandrel from the fitment and from between the sides so that the side edges (29) and top edge of the sides may be sealed to form a completed container.

4 Claims, 1 Drawing Sheet

U.S. Patent  Sep. 20, 1994  5,348,525

METHOD OF CONSTRUCTING FLEXIBLE CONTAINERS WITH TUBULAR FITMENTS

TECHNICAL FIELD

This invention relates to methods of constructing flexible containers with tubular fitments.

BACKGROUND OF THE INVENTION

Many containers which hold and dispense liquids and granular material have been designed with spouts from which their contents are poured. Some of these containers are constructed by mounting an independent spout, more generally referred to as a fitment, to the body of the container, as shown in U.S. Pat. No. 5,002,623. Such a fitment typically has a base from which a neck extends. The neck may be provided with threads so that a cap may be threaded thereon to seal the container.

Fitments have been designed to be heat welded to the outside surface of the body of the container and about an opening. However, because of the flexibility of these containers these types of fitments are susceptible to separation from the body during container handling.

Fitments have also been designed to be mounted in an opening between two layers of plastic which form opposite sides of the container body. The opening is formed by sealing all but a portion of the side edges of the plastic layers, as shown in U.S. Pat. No. 5,002,623. The fitment is then mounted on a mandrel which is inserted into the opening. Once the fitment is inserted the remaining side edges of the plastic layers are sealed about the fitment base with the mandrel supporting the fitment against the pressure of the sealing plate. The sealing process may be done by heat welding, as shown in U.S. Pat. No. 4,023,607, or by any other commonly used welding processes.

Fitments for flexible bottles have also been designed with bases which are larger in diameter than their neck so that the container body does not have to taper severely towards the fitment. This type of fitment aids in pouring by funneling the contents. However, because the fitment neck is narrower than its base a mandrel positioned through the neck cannot also fit flushly against the interior of the base during the sealing process since it could not thereafter be removed through the restricted neck. Therefore, these fitments have been designed with thicker bases to endure the pressure of the sealing plate without deformation. Nevertheless, these thicker plastic fitments still tend to flex during sealing which oftentimes results in a defective seal. Additionally, the increased thickness of these fitments increases the quantity of plastic used in their construction thus increasing their weight and raising their overall cost.

It thus is seen that a need remains for a method of constructing flexible containers with fitments of the type having a base larger in diameter than a neck in a more effective and efficient manner. It is to the provision of such that the present invention is primarily directed.

SUMMARY OF THE INVENTION

In a preferred form of the invention, a method is provided for constructing a container made from a sheet of flexible material with a fitment of the type having a relatively wide tubular base from which a relatively narrow tubular neck extends. The method comprises the steps of forming the sheet into a generally U-shape having a bottom from which two sides extend that have sealable side edges and a sealable top edge. The fitment is placed upon a mandrel which is then positioned between the top edges of the sides. Once the fitment is properly positioned the top edges of the sides are sealed to the fitment base. The mandrel is then removed from the fitment base by moving it towards the sheet bottom and then from between the sides. The side and top edges of the sides are then sealed.

DETAILED DESCRIPTION

Figure 1:
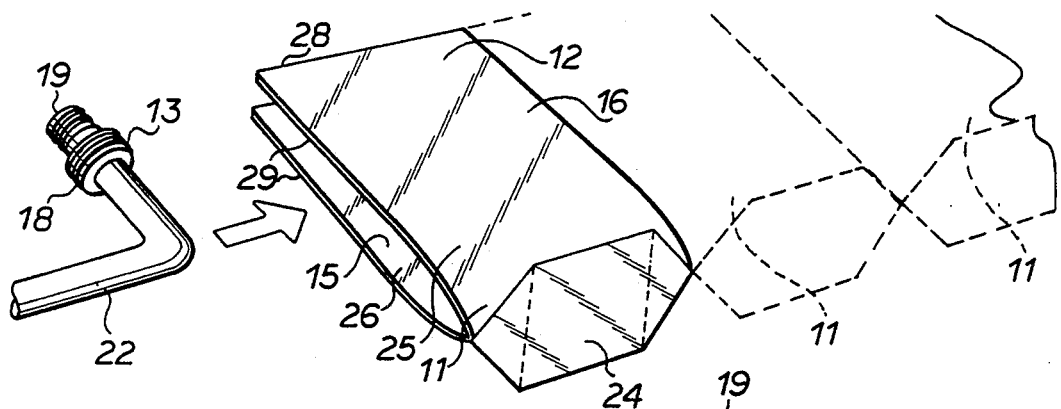
FIGS. 1–4 are perspective views of a portion of a continuous sheet of flexible material in progressive stages of the production of a container body with a fitment mounted therein that embodies principles of the invention in a preferred form.

With reference next to the drawings, there is shown a method of constructing a flexible container 10 having a body 11 formed from a sheet of flexible material 12 and a fitment 13. The sheet of material 12 preferably is of two ply construction having an inner layer 15 of thermally bondable polyethylene and an outer layer 16 of strong, relatively non-thermally bondable nylon or polyester. The fitment here is a spout that has a tubular base 18 and a tubular, threaded neck 19 of smaller diameter than the base that extends coaxially from the base 18. A cap 20 is threaded onto the fitment neck 19 to close the container.

The fitment is mounted to the body during end stages of body construction. In mounting the fitment 13 to the container body 11 the continuous web of sheet material 12 is folded into a generally U-shape so as to have a bottom 24, a side 25 and a side 26 underlaying the side 25. Each of the body sides 25 and 26 has a top edge 28 opposite the bottom 24 with their inner, thermally bondable layers 15 facing each other and side edges 29 which extend from the bottom 24 to the top edge 28. To achieve this folded configuration and bottom the sheet material may be folded as shown in U.S. Pat. No. 5,135,464. For illustrative purposes only, a single container portion of the continuous web of sheet material is shown in solid lines with the remaining portion of the web shown in phantom lines.

Figure 2:
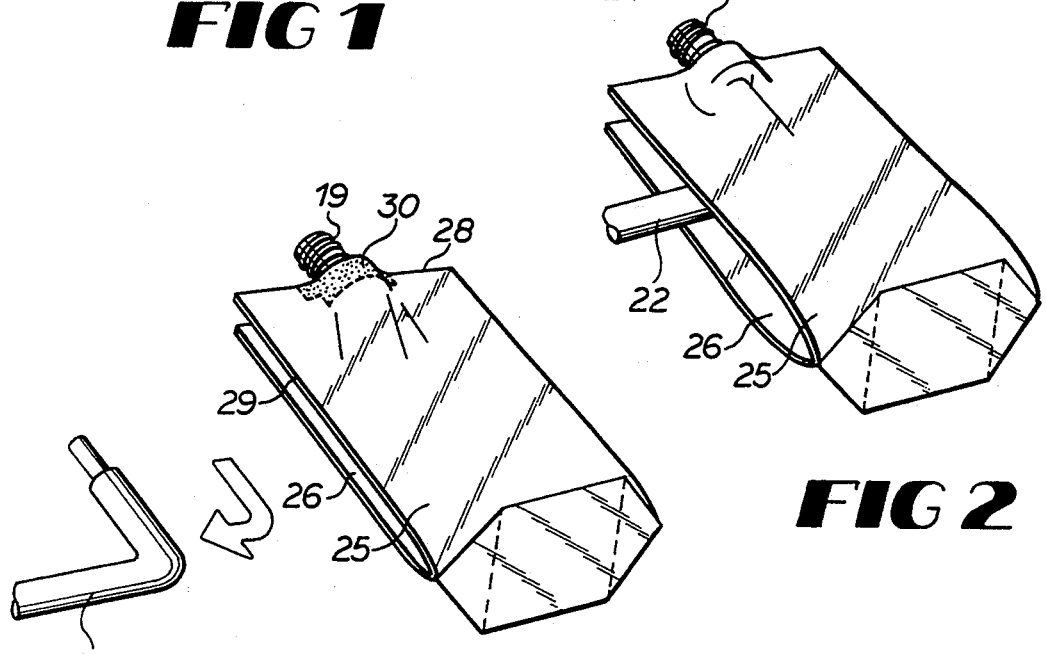

As shown in FIG. 1, a fitment 13 is placed upon an end of a mandrel 22 having a size and shape to conform to the interior of the fitment. With the body side edges 29 spread apart the mandrel supported fitment 13 is positioned centrally between sides 25 and 26 so as to have its base 18 located between the top edges 28 of sides 25 and 26 and its neck 19 extending outwardly from the top edge 28, as shown in FIG. 2. The fitment 13 may be positioned by moving the mandrel 22 to a position between the top and bottom sides of material 25 and 26 or by moving the semi-formed container itself so that side 25 extends over one side of the mandrel and the other side 26 extends over the opposite side of the mandrel.

Figure 3:
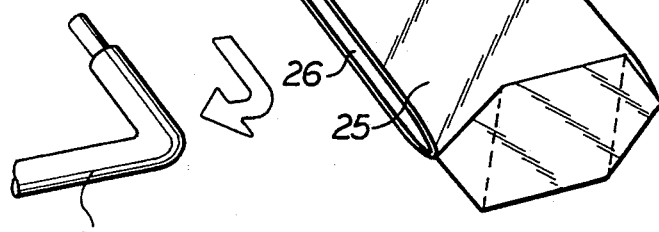

Once the fitment is so positioned, unshown heat sealing clamps are placed about the top edges 28 of the sides and the fitment base 18 thus pressing them against the fitment base that is supported on the mandrel and a seal 30 made between the top edges and fitment base as shown in FIG. 3 by energizing the heat sealing clamps. Seal 30 also seals a small portion of the top edges of the sides 25 and 26 adjacent the fitment to each other. It thus is understood that the mandrel supports the fitment, having a narrower neck than its base, during the sealing process to prevent the deformation of the fitment and thus insuring a proper seal. The mandrel is then withdrawn axially from the fitment 13 and laterally from between the container body sides 25 and 26.

Figure 4:
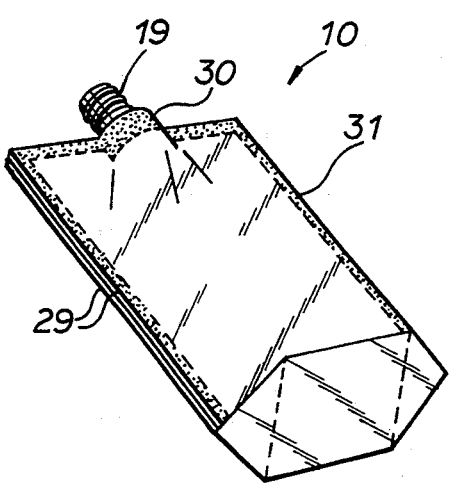

Once the mandrel is fully withdrawn the side edges 29 and the top edges 28 of the sides 25 and 26 are thermally bonded thus forming edge seals 31 as shown in FIG. 4. Edge seals 31 overlap fitment seal 30 to ensure a complete seal about the edges of the sides.

Figure 5:
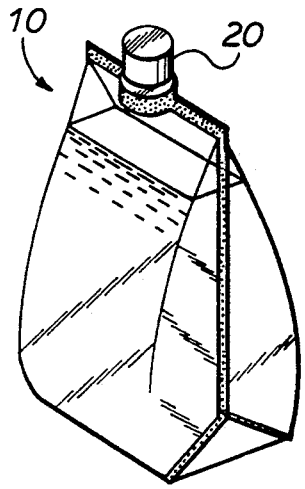
FIG. 5 is a perspective view of the completed and filled container produced in accordance with the process of construction illustrated in FIGS. 1–4.

The completed container may then be filled with a supply of liquid or granular material and capped, thus assuming the shape shown in FIG. 5.

From the foregoing, it is seen that a method for mounting a fitment to a container body is now provided which overcomes problems long associated with those of the prior art. It should however be understood that the just described embodiment merely illustrates principles of the invention in its preferred form. Many modifications, additions and deletions may, of course, be made thereto without departure from the spirit and scope of the invention as set forth in the following claims.

I claim:

1. A method of constructing a container made from a sheet of flexible material with a fitment of the type having a relatively wide tubular base from which a relatively narrow tubular neck extends, and with the method comprising the steps of
   (a) forming the sheet into a generally U-shape having a bottom from which two sides extend that have sealable side edges and a sealable top edge,
   (b) placing the fitment upon a mandrel,
   (c) positioning the fitment base supported on the mandrel between the top edges of the sides,
   (d) sealing the top edges to the fitment base,
   (e) removing the mandrel from the fitment base by moving it towards the sheet bottom and then from between the sides, and
   (f) sealing the sheet along the side edges and top edges, thereby constructing the container.

2. The method of claim 1 wherein step (d) the top edges are heat sealed to the fitment base.

3. The method of claim 1 wherein step (b) the fitment is placed on a mandrel having a size and shape which closely conforms to the interior of the fitment.

4. A method of constructing a container made from a sheet of flexible material with a fitment of the type having a relatively wide tubular base from which a relatively narrow tubular neck extends, and with the method comprising the steps of:
   (a) forming the sheet so as to have a bottom from which two, overlaying container sides extend that have sealable side edges and a sealing top edge,
   (b) placing a fitment upon a mandrel;
   (c) extending one container side over the mandrel supported fitment while simultaneously extending the other container side over the opposite side of the mandrel supported fitment;
   (d) sealing the top edges of the container sides about the mandrel supported fitment;
   (e) removing the mandrel from the fitment base by moving it towards the bottom and from between the container sides; and
   (f) sealing the side edges and top edge of the overlaying container sides to complete the construction of the container.

* * * * *